No. 854,348. PATENTED MAY 21, 1907.
W. V. GORDON.
VALVE FOR DRAINING PIPES, &c.
APPLICATION FILED MAR. 10, 1905.

Witnesses
R. A. Boswell.
Alfred T. Gage.

Inventor
Wm. V. Gordon,
By Franklin H. Hough
Attorney

UNITED STATES PATENT OFFICE.

WILLIAM VERNOR GORDON, OF NEW YORK, N. Y.

VALVE FOR DRAINING PIPES, &c.

No. 854,348.      Specification of Letters Patent.      Patented May 21, 1907.

Application filed March 10, 1905. Serial No. 249,412.

*To all whom it may concern:*

Be it known that I, WILLIAM VERNOR GORDON, a citizen of the United States, residing at New York, in the county of New York and State of New York, have invented certain new and useful Improvements in Valves for Draining Pipes, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to sliding gate valves, adapted for use in connection with water distribution throughout buildings, etc.

More especially, the invention provides a by-pass which draws off the waste water out through the upper portion of said valve. Furthermore, the by-pass in the valve may be closed through the medium of the sliding gate coming into contact with a seat in the upper portion of the casing.

To these ends and to such others as the invention may pertain, the same consists in the novel arrangement, adaptation and combination of features which will be hereinafter more fully described and then pointed out in the appended claims.

The invention is illustrated in the accompanying drawings, which, with the letters of reference marked thereon, form a part of this application, such letters of reference indicating like parts in the views, in which:—

Figure 1:
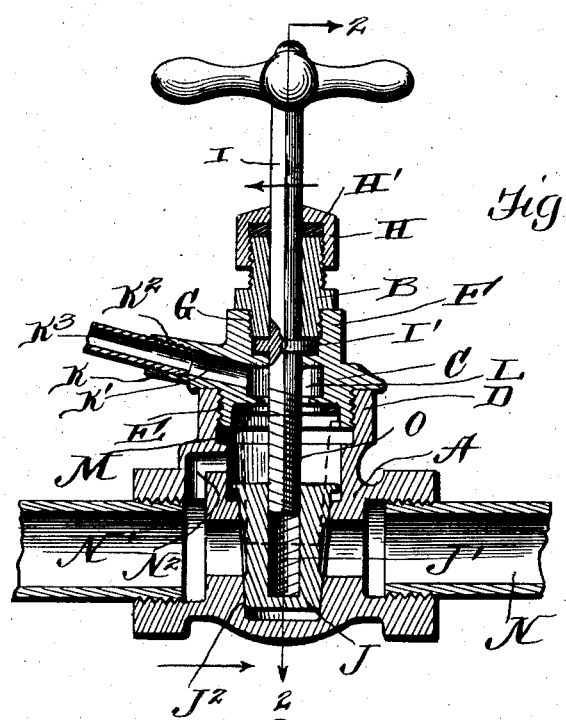
Figure 2:
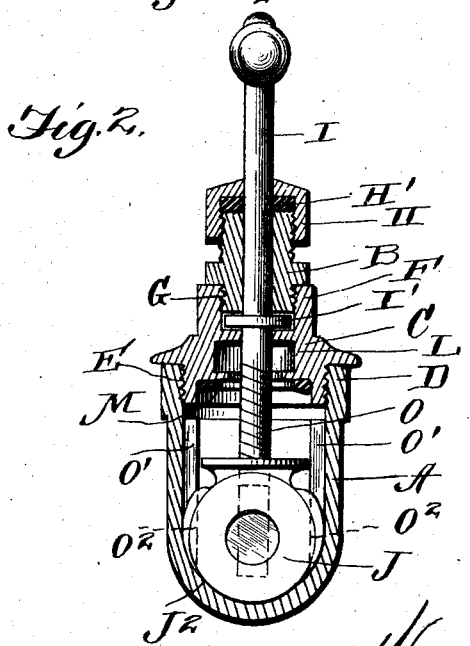

Figure 1 is a sectional view of a sliding gate valve, showing a by-pass, and Fig. 2 is a sectional view at right angles to Fig. 1 upon line 2—2.

Reference now being had to the details of the drawings by letter, A designates the lower portion of the casing of a sliding valve, B designates the upper portion and C designates the intermediate portion. The lower portion A of the casing is provided with an upper cylindrical offset D, having threads upon its inner circumference, which threads are adapted to be engaged by the threaded portion E of the intermediate portion C. F designates a cylindrical portion of said intermediate portion C, having threads upon its inner circumference, which threads are adapted to be engaged by the threaded portion G of the portion B. The upper portion of the said portion B is threaded, and provided with an internally threaded nut H, and between said nut H and the upper portion of the said portion B is a packing ring H'.

I designates a valve stem, having an enlargement I' substantially at the middle of said stem, said enlargement being placed between the portion C and the portion B, for the purpose of preventing said stem from having vertical reciprocating movement.

J designates a sliding gate of the valve, having a cylindrical threaded bore J', and said gate is made wedge-shaped, for the purpose of having a water-tight connection with the seat $J^2$ of the valve. The portion C of the valve is provided with an offset K, said off-set having a cylindrical bore K', a portion of which is threaded, as at $K^2$, for the purpose of engagement with a waste pipe $K^3$. The bore of said offset K communicates with the waste chamber L substantially at the middle of the portion C. The lower portion of said waste chamber is larger in diameter than the stem of the valve, for the purpose of allowing the waste fluid to pass easily therethrough. To allow the sliding gate of the valve to have water-tight connections in its upward movement, a washer M is provided, and also the upper part of the sliding gate is provided with a bearing portion to have engagement with said washer M.

N designates the inlet to the valve, and N' the outlet, and just above the cylindrical passage of the outlet in the wall of the casing of the valve is an aperture $N^2$, which allows the waste fluid, when the sliding gate is closed, to pass therethrough, and thence through the bore K' in the offset K; thus it will be seen how the waste fluid is drawn off, reference being had to the drawings. To allow the sliding gate of the valve to have a quick upward movement when the stem I is rotated, the said stem is provided with threads O, which are substantially at an angle of 15 degrees, said threads being adapted for engagement with similar threads in the bore J'; thus it will be seen how the gate is raised. To guide the gate in its upward movement, ribs O' are provided upon the inner sides of the lower casing of the valve, said guide ribs being adapted to be engaged by the guide slots $O^2$ in the cylindrical portion of the gate J.

The operation of the invention is as follows: Normally the sliding gate is in raised position, as shown in dotted lines in Fig. 1, in order to allow free distribution of fluid throughout buildings, etc. While the sliding gate is at its highest point, the bearing upon said gate forms water-tight connections between the said bearing and the washer M, as will be clearly understood by referring to the drawings. To draw off the waste fluid, the stem I is rotated in the direction of the arrow, as shown in Fig. 1 of the drawings, which will allow the sliding gate to fall, which prevents the distribution of the fluid and allows the waste fluid to pass through the aperture $N^2$ in the wall of the casing of said valve, and thence through the bore K' in the offset K of the intermediate portion C; thus the operation and detailed construction of the device will be readily understood by referring to Figs. 1 and 2 of the drawings.

Of course, it is distinctly understood that various changes in the details of construction and combination of parts other than those illustrated in the accompanying drawings may be made, if desired, without in any way departing from the spirit and scope of the invention.

Having thus fully described my invention, what I claim as new and desire to secure by Letters Patent, is:—

A valve casing provided with a lateral extension, a threaded opening, a plug fitted in said threaded opening, a valve mounted upon a tapering seat within the casing and provided with a threaded stem, said plug having an integral tubular extension to which a pipe is connected, the wall of the shell having a by-pass leading from above the valve to a location adjacent to one end of the valve casing, a threaded plug in which said stem has a bearing, and a cap fitted to said plug and through which the stem passes, as set forth.

In testimony whereof I hereunto affix my signature in presence of two witnesses.

WILLIAM VERNOR GORDON.

Witnesses:
  JOHN J. HICKEY,
  CHARLES STUART.